United States Patent [19]

Magg et al.

[11] Patent Number: 4,540,074

[45] Date of Patent: Sep. 10, 1985

[54] CLUTCH ASSEMBLY FOR GEAR TRANSMISSION

[75] Inventors: Alfred Magg; Walter Griesser, both of Friedrichshafen, Fed. Rep. of Germany

[73] Assignee: Zahnradfabrik Friedrichshafen AG, Friedrichshafen, Fed. Rep. of Germany

[21] Appl. No.: 500,292

[22] Filed: Jun. 2, 1983

[30] Foreign Application Priority Data

Jun. 9, 1982 [DE] Fed. Rep. of Germany ....... 3221712

[51] Int. Cl.³ ............................................. F16D 23/06
[52] U.S. Cl. .................... 192/53 G; 74/339; 192/53 F
[58] Field of Search .............. 192/53 G, 53 F; 74/339

[56] References Cited

U.S. PATENT DOCUMENTS

| | | | |
|---|---|---|---|
| 2,410,511 | 11/1946 | Letsinger et al. | 192/53 F |
| 2,942,712 | 6/1960 | Altmann | 192/53 F |
| 4,033,437 | 7/1977 | Labat | 192/53 F |
| 4,238,012 | 12/1980 | Takiguchi et al. | 192/53 F |
| 4,349,090 | 9/1982 | Griesser | 192/53 G |

FOREIGN PATENT DOCUMENTS

| | | |
|---|---|---|
| 2714035 | 10/1978 | Fed. Rep. of Germany ... 192/53 G |
| 2915965 | 11/1982 | Fed. Rep. of Germany . |
| 3039231 | 1/1983 | Fed. Rep. of Germany . |
| 2029519 | 3/1980 | United Kingdom ............. 192/53 G |
| 2085984 | 5/1982 | United Kingdom ............. 192/53 G |

*Primary Examiner*—Ronald C. Capossela
*Attorney, Agent, or Firm*—Karl F. Ross; Herbert Dubno

[57] ABSTRACT

A driving gear having external teeth in mesh with internal teeth of a sliding sleeve, adapted to be axially shifted into meshing engagement with external teeth of a driven gear coaxially adjoining the driving gear, carries several peripherally spaced, universally jointed rockers which project radially under spring pressure into axially extending inner peripheral guide grooves of the sleeve. A synchro ring coaxial with the two gears is rotationally entrained by the driving gear, through the intermediary of the rockers thereof, and has a clutch surface confronting a similar surface of the driven gear across a narrow clearance which closes when the ring, under an axial thrust from the rockers in response to an incipient coupling shift of the sleeve, is moved toward the driven gear. As long as a speed difference exists between the two gears, the synchro ring exerts upon the rockers a peripheral force which urges them into lateral pockets of the respective guide grooves so as to prevent a completion of the coupling shift until synchronism has been established. The driven gear and the synchro ring may be duplicated on opposite sides of the driving gear and the sleeve.

12 Claims, 8 Drawing Figures

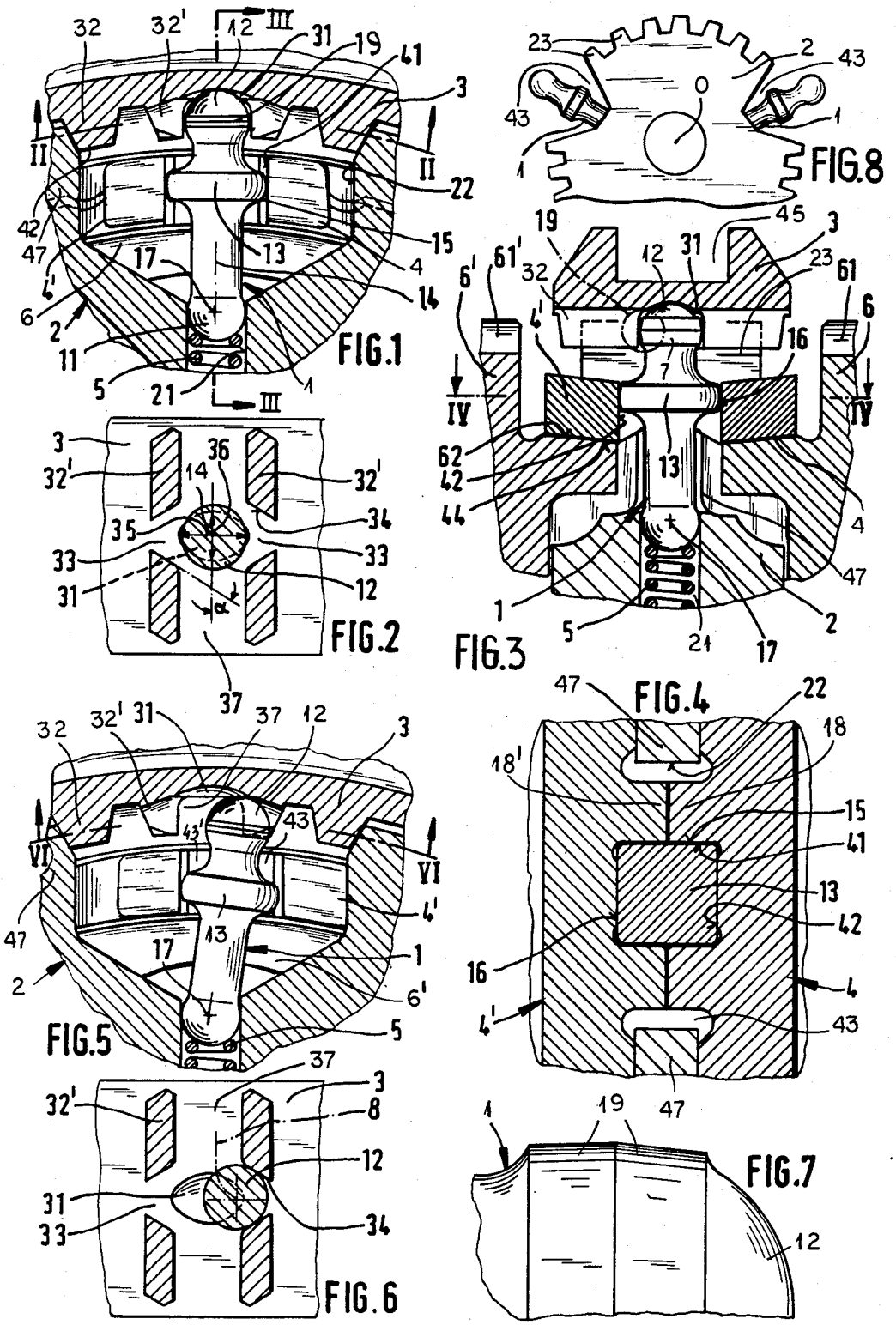

CLUTCH ASSEMBLY FOR GEAR TRANSMISSION

FIELD OF THE INVENTION

Our present invention relates to a clutch assembly for an automotive or other transmission system in which a pair of coaxial gears, one of which may be at rest, can be positively interconnected for joint rotation by an internally toothed sleeve meshing only with one gear in a decoupling position but engaging the teeth of both gears in a coupling position into which it is slidable after the two gears have been synchronized, i.e. are rotating at the same speed (which in certain cases could even be zero).

BACKGROUND OF THE INVENTION

A clutch assembly of this type is the subject matter of commonly owned U.S. Pat. No. 4,349,090, in the name of one of us, Walter Griesser, and application Ser. No. 312,129 filed Oct. 16, 1981 now U.S. Pat. No. 4,425,990 by the same applicant. According to these prior disclosures, an externally toothed first (e.g. driving) gear carries several peripherally spaced spring-loaded detent members or rockers which extend radially into an inner peripheral groove of the internally toothed coupling sleeve while the latter is in a decoupling position, i.e. is disengaged from a coaxially adjoining second (e.g. driven) gear having external teeth of the same diameter and pitch. Upon an incipient coupling shift of the sleeve, i.e. an axial displacement thereof toward the second gear, the rockers exert an axial thrust upon a synchro ring which is limitedly rotatable relatively to the first gear and has a clutch surface confronting a similar surface of the second gear across a narrow clearance. As that clearance is eliminated by the thrust, the synchro ring is frictionally coupled with the second gear and is limitedly rotated, relatively to the first gear, about the common gear axis. This relative rotation, in a direction dependent on the speed difference between the two gears, causes each rocker to come to rest against one of two bracketing projections on the synchro ring so as to prevent a radial inward displacement of the rockers by camming engagement with the sleeve until the speed difference between the two gears has been substantially eliminated. It is only then that the sleeve can cam the rockers radially inward to complete the coupling shift.

The rocker members of the described clutch assembly act as levers whose mechanical advantage amplifies the exerted gear-shifting force as transmitted to the coacting clutch surfaces of the synchro ring and the second gear. This mechanical advantage enables a significant acceleration of the coupling shift since the time t for completing that shift is given by $$F_a = \frac{J \cdot \Delta\omega \cdot k}{t}$$

where J is the mass moment of inertia of the rotating parts whose speed is to be changed, $\Delta\omega$ represents the difference in the rotary speeds of the two gears and k is a proportionality factor. The effective increase in the exerted axial force $F_a$ is particularly useful for the shifting of gears in heavy-duty vehicles, such as trucks or tractors, which in many instances are still being shifted manually.

Certain shortcomings of that prior clutch assembly, however, call for further improvement. Thus, the axial thrust exerted upon the synchro ring in the initial phase of a coupling shift is transmitted via beveled surfaces of the sleeve and the rockers giving rise to additional resistance components that must be overcome. The frictional resistance increases with the leverage and may cause jamming even with relatively small values of the aforementioned mechanical advantage. The completion of the shift requires a radially inward depression of the rockers against the force of their biasing springs which is supplemented by the centrifugal force of the rotatin first gear. Moreover, if the confronting clutch surfaces of the synchro ring and the second gear are frustoconical (they could also be formed by interleaved annular friction disks as likewise disclosed in the two prior applications), the combined radial and pivotal motion of the rockers may tend to disalign the two clutch surfaces so as to cause unsymmetrical wear.

In another commonly owned pending application, Ser. No. 391,868, filed June 24, 1982 by Erich Tausend now U.S. Pat. No. 4,475,639, there has been disclosed a modified clutch assembly designed to obviate some of the drawbacks of earlier systems. According to that disclosure, the inner peripheral groove of the coupling sleeve is replaced by an axially disposed inner guide groove associated with each detent member or rocker, the latter being universally jointed to the aforementioned first gear at a fixed fulcrum. In the decoupling position, in which the inner teeth of the sleeve are not in mesh with the outer teeth of a coaxially adjoining second gear, a free end of each rocker extends radially into the respective guide groove which has lateral pockets positioned to receive that free end and limit its motion in an axial plane upon a relative angular disalignment of the synchro ring and the first gear from a normal median position thereof; such angular disalignment results from a speed difference between the first and second gears upon the establishment of frictional contact between the clutch surfaces of the second gear and the synchro ring by an axial thrust exerted at the beginning of a coupling shift upon the latter through the intermediary of the rockers. The lateral pockets of each guide groove are bounded by camming edges dislodging the free end of the associated rocker therefrom in response to a continuing axial thrust, upon establishment of substantial synchronism between the two gears, to enable a completion of the coupling shift.

As further disclosed in the Tausend application, the free end of each rocker is provided with a spring-loaded contact element—specifically a sphere—receivable in a central depression of the bottom of the respective guide groove when the sleeve is in its decoupling position. That application also teaches the formation of each guide groove in a separate insert which, after machining, is fitted into the sleeve.

Another peculiarity of the assembly disclosed in the Tausend application is the fact that each rocker, which is prevented from moving radially on account of its fixed fulcrum, bears a collar that is limited tiltable as well as radially slidable thereon and is spring-biased in a radially outward direction against overhanging shoulders of the synchro ring in order to center same on the gear axis. The interposition of such a collar between each rocker and the adjoining synchro ring—or pair of synchro rings on opposite sides of the first gear—prevents the exertion of a radially inwardly directed frictional force upon the synchro ring by a rocker tilted in the axial or the peripheral direction.

OBJECT OF THE INVENTION

The object of our present invention is to provide a simplified clutch assembly which obviates the above-discussed drawbacks of earlier systems.

SUMMARY OF THE INVENTION

We have found, in accordance with our present invention, that this object can be attained by replacing the fixedly fulcrumed rockers of the Tausend application with rockers or detent members which, similarly to those of the earlier Griesser patent and application, are resiliently biased in a radially outward direction while still being universally jointed to the aforementioned first gear, with elimination of the spring-loaded contact elements and radially slidable collars referred to above. Thus, the free end of each rocker directly engages in an associated axially disposed inner guide groove of the coupling sleeve having lateral pockets for receiving that free end upon relative angular disalignment of the first gear and an adjoining synchro ring. This free end is preferably shaped as a generally spherical head but with a barrel-shaped zone positioned for engagement with the camming edges of its guide groove. The bottom of that guide groove may again be provided, as in the Tausend application, with a central depression which has a major dimension in the peripheral direction and terminates at the lateral pockets of the groove.

Pursuant to yet another feature of our invention, each guide groove is flanked by a pair of truncated internal teeth of the coupling sleeve which are split by oppositely diverging gaps forming the lateral pockets.

The function of the spring-loaded collar of the Tausend disclosure is taken over in our present clutch assembly by a bulge on the rocker itself which is partly received in a recess of an adjoining synchro ring; in a two-way clutch assembly in which the first gear is bracketed by two second gears which can be selectively coupled thereto, the bulge is in positive contact with both synchro rings by partly occupying confronting recesses thereof. The bulge, advantageously, then has a substantially rectangular—e.g. square—outline in a plane perpendicular to the axis of the generally cylindrical rocker, the confronting recesses being also substantially rectangular.

BRIEF DESCRIPTION OF THE DRAWING

The above and other features of our invention will now be described in detail with reference to the accompanying drawing in which:

FIG. 1 is a fragmentary cross-sectional view of a clutch assembly embodying this invention;

FIG. 2 is a fragmentary view of an inner surface of a coupling sleeve, taken on the line II—II of FIG. 1;

FIG. 3 is a fragmentary sectional view taken on the line III—III of FIG. 1;

FIG. 4 is a fragmentary sectional view taken on the line IV—IV of FIG. 3;

FIG. 5 is a view similar to FIG. 1 in a position of angular disalignment between a central gear and an adjoining synchro ring;

FIG. 6 is a view similar to FIG. 2, taken on the line VI—VI of FIG. 5;

FIG. 7 is an enlarged side view of a head of a rocker shown in FIGS. 1, 3 and 5, and FIG. 8 is a face view of part of the aforementioned central gear, showing a plurality of peripherally spaced-apart rockers.

SPECIFIC DESCRIPTION

The assembly shown in the drawing comprises a central driving gear 2 flanked by a pair of driven gears 6, 6', these gears being provided with nonillustrated shafts centered on a common axis of rotation indicated at 0 in FIG. 8. Also centered on that axis are two synchro rings 4 and 4' symetrically disposed, like gears 6 and 6', on opposite sides of a plane of rotation. A plurality of peripheral cutouts 43 of gear 2 are angularly equispaced about its circumference. Each cutout 43 ends in a radial bore 21 receiving a generally spherical foot 17 of a respective detent member or rocker 1 which is radially outwardly biased by an associated coil spring 5 lodged in that bore. Each rocker 1 also has a generally spherical head 12 pressed by the spring 5 into a central depression 31 of a guide groove 37 which extends axially on the inner peripheral surface of a coupling sleeve 3 shiftable along axis 0. Sleeve 3 has an outer peripheral groove 45 engageable by the usual shift fork (not shown) whereby internal teeth 32 thereof can selectively mesh with external teeth 61 or 61' of driven gear 6 or 6' while remaining engaged with external teeth 23 of driving gear 2 as schematically indicated in FIG. 3. Each guide groove 37 is defined by a pair of truncated teeth 32' of sleeve 3 which form gaps 33 with camming edges 34 including angles $\alpha$ with the axial direction, these angles preferably ranging between about 30° and 75°. The gaps 33 constitute lateral pockets of the associated guide groove 37 into either of which the head 12 of the respective rocker is deflected, depending on the direction of relative rotation of driving gear 2 and driven gear 6 or 6', at the beginning of a clutch-engagement stroke designed to couple one of these driven gears to gear 2.

As seen in FIGS. 2 and 6, depression 31 has a generally elliptical contour with a major axis 35 and a minor axis 36 respectively extending in the peripheral and the axial direction of the gear assembly. Depression 31 is arcuately curved about a line parallel to axis 0.

The cylindrical stem of rocker 1 has an axis 15 which in a decoupled position (FIGS. 1–3) extends in a radial direction. A bulge 13 on the rocker stem has a square outline in a plane perpendicular to axis 14, as seen in FIG. 4, and is framed by two complementary rectangular recesses of synchro rings 4 and 4' defined by axially and peripherally extending surfaces 41 and 42 in contact with respective thrust faces 15 and 16 of bulge 13. These recesses lie in projections 18 and 18' of rings 4 and 4' extending axially into each cutout 43 of gear 2, the cutout diverging radically outwardly from bore 21 between ribs 47 of that gear with contact surfaces 22 limiting the angular displacement of the two synchro rings relatively thereto. Bulge 13 has convex generatrices in planes parallel to the rocker axis 14, i.e. at its points of engagement with contact surfaces 41 and 42.

From FIG. 4 it will further be noted that the two synchro rings 4 and 4' abut each other as well as the ribs 47 of gear 2 when the rockers 1 are in their centered positions. These rings further have frustoconical clutch surfaces 44 which, as in the commonly owned patent and applications identified above, frictionally contact respective surfaces 62 of driven gears 61 and 61' upon an incipient shift of coupling sleeve 3 to the right or to the left as viewed in FIG. 3.

The head 12 of rocker 1 is advantageously formed with a barrel-shaped zone 19, best seen in FIG. 7, designed to enlarge the area of contact between that head and the camming surfaces 34 bounding the pockets 33 when the head is thrust into one of these pockets by a relative rotation of driving gear 2 and one of the two driven gears, e.g. 6' as illustrated in FIG. 5. This occurs, as explained above, when the coupling sleeve 3 is axially shifted (to the left in FIG. 3) to couple the gears 2 and 6' to each other for joint rotation. The frictional contact between clutch surfaces 44 and 62 of ring 4' and gear 6' rapidly equalizes the speeds of the two gears whose initial differences resulted in a tilting of the rocker, e.g. clockwise as shown in FIG. 5. With the disappearance of the tilting force upon such equalization, and with continuous exertion of axial pressure on coupling sleeve 3, the rocker head 12 is cammed out of the engaged pocket 33 by the upper right-hand sloping surface 34 so as to move into the upper part of guide groove 37 as viewed in FIG. 6, its tip leaving the depression 31 engaged by it up to that instant; this motion has been indicated by a dot-dash line 8 in FIG. 6. Sleeve 3 is now free to complete its leftward motion (as viewed in FIG. 3) so that its teeth 32, 32' come into mesh with teeth 61' of gear 6', thereby establishing a positive connection between that gear and driving gear 2. The foot 17 of each rocker could also be provided with a barrel-shaped contact zone similar to that of head 12.

It will be understood that the central gear 2 could also be stationary so that the described assembly acts as a brake rather than as a clutch upon the shaft of the previously rotating flanking gear 6 or 6'. It is also possible to have, say, the gear 6 fixed and the gear 6' externally driven whereby gear 2 can be selectively entrained or arrested.

The frustoconical clutch surfaces 44 and 62 may be replaced by other surfaces, e.g. as shown in FIGS. 5 and 8 of Griesser Pat. No. 4,349,090.

The parts of sleeve 3 forming the guide groove 37, i.e. those bearing the truncated teeth 32', may be designed as separate inserts as taught in the commonly owned U.S. Pat. No. 4,475,639.

Finally, the two synchro rings could be interconnected for joint axial motion, e.g. in the manner described in the Tausend application whose disclosure is hereby incorporated by reference into the present one.

We claim:

1. In a gear transmission having a first gear, a second gear coaxial with said first gear, said gears being provided with respective sets of external teeth of like pitch and diameter, and an internallly toothed sleeve meshing only with the teeth of said first gear in a decoupling position, said sleeve being axially slidable into a coupling position in which it meshes with the teeth of said first and second gears for positively connecting same to each other, the combination therewith of a synchro ring coaxially interposed between said gears with freedom of limited rotation relative to said first gear, said synchro ring and said second gear being provided with confronting clutch surfaces separated by a small clearance from each other in the decoupling position of said sleeve, a detent member universally jointed to said first gear, resilient means on said first gear exerting a radially outward force upon said detent member, a free end of said detent member extending substantially radially into an axially disposed inner guide groove of said sleeve in said decoupling position while being positively entrainable by said synchro ring in either peripheral direction, said guide groove being provided with lateral pockets to receive the free end of said detent member upon a relative angular disalignment of said synchro ring and said first gear from a normal median position, such disalignment resulting from a speed difference between said first and second gears upon the establishment of frictional contact between said clutch surfaces by an axial thrust exerted upon said synchro ring via said detent member whose free end is indexable on said sleeve for peripheral entrainment thereby upon an incipient axial coupling shift thereof, said lateral pockets being bounded by camming edges dislodging said free end therefrom in response to a continuing axial thrust upon establishment of substantial synchronism between said gears for enabling a completion of said coupling shift.

2. The combination defined in claim 1 wherein said detent member is one of a plurality of identical, generally cylindrical rockers peripherally equispaced about the gear axis and received in respective cutouts of said first gear, said resilient means comprising a compression spring in each of said cutouts.

3. The combination defined in claim 1 wherein said free end is formed as a generally spherical head.

4. The combination defined in claim 3 wherein said head has a barrel-shaped zone positioned for engagement with said camming edges.

5. The combination defined in claim 3 wherein said guide groove is provided with a generally elliptical central depression engaged by said head in said decoupling position, said depression having a major axis extending in peripheral direction and terminating at said pockets.

6. The combination defined in claim 1 wherein said groove is flanked by a pair of truncated internal teeth of said sleeve provided with oppositely diverging gaps forming said pockets.

7. In a gear transmission having a first gear, a pair of second gears coaxial with said first gear on opposite sides thereof, said gears being provided with respective sets of external teeth of like pitch and diameters, and an internally toothed sleeve meshing only with the teeth of said first gear in a decoupling position, said sleeve being axially slidable into a coupling position in which it meshes with the teeth of said first gear and one of said second gears for positively connecting same to each other, the combination therewith of a pair of synchro rings coaxially interposed between said first gear and said second gear, respectively, with freedom of limited rotation relative to said first gear, said synchro rings and said second gears being provided with respective pairs of confronting clutch surfaces separated by a small clearance from each other in the decoupling position of said sleeve, a detent member universally jointed to said first gear, resilient means on said first gear exerting a radially outward force upon said detent member, a free end of said detent member extending substantially radially into an axially disposed inner guide groove of said sleeve in said decoupling position while being positively entrainable by said synchro rings in either peripheral direction, said guide groove being provided with lateral pockets to receive the free end of said detent member upon a relatively angular disalignment of either of said synchro rings and said first gear from a normal median position, such disalignment resulting from a speed difference between said first gear and a respective second gear upon the establishment of frictional contact between the corresponding pair of clutch surfaces by an axial thrust exerted upon said synchro ring via said detent member whose free end is indexable on said sleeve for peripheral entrainment thereby upon an incipient axial coupling shift thereof, said lateral pockets being bounded by camming edges dislodging said free end therefrom in response to a continuing axial thrust upon establishment of substantial synchronism between said first gear and the respective second gear for enabling a completion of said coupling shift.

8. The combination defined in claim 7 wherein said detent member is one of a plurality of identical, generally cylindrical rockers peripherally equispaced about the gear axis and received in respective cutouts of said first gear, said resilient means comprising a compression spring in each of said cutouts.

9. The combination defined in claim 8 wherein each of said rockers has a bulge partly received in confronting recesses of said synchro rings.

10. The combination defined in claim 9 wherein each of said cutouts ends in a bore surrounding the respective compression spring and receiving a generally spherically curved foot of the respective rocker, each cutout diverging radially outwardly from said bore between peripherally spaced-apart ribs of said first gear, said synchro rings having projections formed with said recesses and bracketed with limited peripheral clearance by said ribs.

11. The combination defined in claim 9 wherein said bulge is of substantially rectangular outline in a plane perpendicular to the cylinder axis and is convex in planes parallel to said cylinder axis, said recesses being substantially rectangular.

12. The combination defined in claim 11 wherein said outline is a square.

* * * * *